United States Patent
Marcus (10) Patent No.: US 6,596,174 B1
(45) Date of Patent: Jul. 22, 2003

(54) DIESEL FUEL CLEANING AND RE-CIRCULATION SYSTEM

(76) Inventor: Alexander C. Marcus, 11002 Racoon Ridge, Reston, VA (US) 22091-4910

( * ) Notice: Subject to any disclaimer, the term of this patent is extended or adjusted under 35 U.S.C. 154(b) by 0 days.

(21) Appl. No.: 09/151,768

(22) Filed: Sep. 11, 1998

(51) Int. Cl.$^7$ .................. B01D 37/04; B01D 35/06; B03C 1/30
(52) U.S. Cl. .............. 210/695; 210/744; 210/764; 210/805; 210/85; 210/86; 210/88; 210/104; 210/143; 210/167; 210/172; 210/223; 210/241; 210/248; 210/416.4
(58) Field of Search .................. 210/767, 764, 210/739, 744, 222–223, 416.4, 85–88, 172, 167, 241, 805, 103–104, 143, 695, 248

(56) References Cited

U.S. PATENT DOCUMENTS

| | | | | |
|---|---|---|---|---|
| 3,188,974 A | * | 6/1965 | Rosaen | 210/172 |
| 3,618,777 A | * | 11/1971 | Meyer | 210/416.4 |
| 3,677,284 A | * | 7/1972 | Mendez | |
| 3,918,942 A | * | 11/1975 | Rechtsteiner et al. | 210/172 |
| 4,234,920 A | * | 11/1980 | Van Ness et al. | |
| 4,360,436 A | * | 11/1982 | Poveromo | 210/172 |
| 4,861,469 A | * | 8/1989 | Rossi et al. | 210/172 |
| 5,055,188 A | * | 10/1991 | Johnston et al. | 210/222 |
| 5,059,312 A | * | 10/1991 | Galletti | 210/172 |
| 5,078,901 A | * | 1/1992 | Sparrow | 210/172 |
| 5,122,264 A | * | 6/1992 | Mohr et al. | 210/172 |
| 5,139,658 A | * | 8/1992 | Hodge | 210/172 |
| 5,149,433 A | * | 9/1992 | Lien | 210/172 |
| 5,192,430 A | * | 3/1993 | Mohr | 210/172 |
| 5,195,494 A | * | 3/1993 | Tuckey | 210/172 |
| 5,248,437 A | * | 9/1993 | Forrest | 210/695 |
| 5,597,601 A | * | 1/1997 | Griffin | 210/241 |
| 5,688,076 A | * | 11/1997 | Atkins | 210/241 |
| 5,711,456 A | * | 1/1998 | Bryant | |

OTHER PUBLICATIONS

ESI Clean Fuel System(TM), 4 pages, ©1996.*

* cited by examiner

*Primary Examiner*—Robert J. Popovics
(74) *Attorney, Agent, or Firm*—John S. Hale; Gipple & Hale (57) ABSTRACT

A fuel recirculation and cleaning assembly comprising a planar surfaced support base, an upright support secured to the support base and a flange extending from support base to form an enclosed area around the planar surface. A filter assembly for separating water from fuel and trapping particulate matter is mounted to the upright support and a discharge pump is fluidly connected to the filter assembly discharge water separated from the fuel by the filter assembly to a water storage tank. A magnetic microbial decontamination device is secured to the upright support and fluidly connected to the filter assembly by a conduit to receive filtered fuel from an outlet of the filter assembly and pass the fuel through a magnetic field which destroys microbial residues in the fuel. A circulation pump is mounted on the support base and is fluidly connected to an outlet of said microbial decontamination device by conduit means to discharge treated fuel to a fuel storage tank. The operation of the assembly is controlled by a timer mechanism.

14 Claims, 13 Drawing Sheets

DIESEL FUEL CLEANING AND RE-CIRCULATION SYSTEM

BACKGROUND OF THE INVENTION

1. Field of Invention

The present invention relates to a fuel cleaning system and specifically is directed toward a system which recirculates stored petroleum distillates removing water, suspended solids and destroying microbiologic growth in the distillate.

2. Description of the Prior Art

Fuel storage tanks have long suffered from the problem that water condensing in the tank and separating from the fuel together with microbial growth and particulate matter have made the fuel unusable for generators and internal combustion engines. Attempts to solve this significant problem have taken the form of filters and chemical additives. While filters have been used to remove particulate matter and separate water from the fuel, the discharge of the water has resulted in unsafe and unhealthy conditions while bacteria growth in the fuel clogs the filters. The use of chemical additives to kill the organic growth can result in toxic conditions in the resultant waste water which are harmful to humans resulting in violations of the Environmental Protection Agency regulations for discharge of waste water. Such waste water may have to be specifically disposed of in defined areas or further treated to neutralize the chemicals present. Furthermore such chemical additives have specific life spans and must be carefully metered to correct proportions when used with the fuel. An additional problem is involved in accurately mixing the chemical additive with the fuel to prevent bacterial growth while precluding harmful combustion by-product discharges.

SUMMARY OF THE INVENTION

The present inventive system performs water separation, particulate filtration, microbe and biological decontamination and fuel re-circulation or transfer. The system controls range from a basic manually operated twist timer to a sophisticated microprocessor controller with key critical alarms and optional remote monitoring capability. The operations of the system are performed by diesel fuel particulate filter mechanisms which perform water separation and particulate removal, bacterial decontamination and systematic fuel re-circulation with optional microprocessor controls. The system is designed for operator set automatic cycling (unmanned) via an electronic timer and other controls and will be operational weekly for a duration determined by the fuel quantity in the storage bank, for a maximum 30 hours/week (1560 hours/year) based on recommended re-circulation cycles (150% of tank capacity).

It is an object of the invention to provide a fuel recirculation and cleaning assembly with long service life and minimal maintenance, consistent with the life expectancy of the continuous power supply systems or internal combustion engines they are designed to protect.

It is another object of the invention is to provide an open/skid mounted design suitable for installation inside an existing weather-proof enclosure or in weather-protected mechanical or engine room with a stand-by generator or engine.

It is still another object of the invention to provide a wheeled open/skid mounted design suitable for moveable installation inside an existing weather-proof enclosure, or in weather-protected mechanical or engine room.

It is yet another object of the invention to automatically re-circulate diesel fuel at a minimum flow rate of 250–1350 GPH.

In response to the needs still left unresolved by the prior art devices, the present invention simultaneously treats and recirculates fuels. These and other objects, advantages, and novel features of the present invention will become apparent when considered with the teachings contained in the detailed disclosure along with the accompanying drawings.

DETAILED DESCRIPTION OF PREFERRED EMBODIMENT

The preferred embodiment and the best mode of the present invention is shown in FIGS. 1 through 5. The fuel cleaning and recirculation assembly 20 is mounted on a skid platform 22 formed of rolled steel with a base section 24 having a planar support surface 25 and an upright flange 26 which forms an enclosed upper surface. All unfinished steel material used will be brushed, primed, and painted with a hard finish single component urethane. The base 24 is provided with legs 28 having an aperture 30 which allows the skid platform to be bolted to the floor or alternatively to be provided with a wheel assembly 32 which allows the fuel recirculation assembly to be easily moved from location to location. While the terms "diesel" or "fuel" are used throughout this application it is to be understood that this term is meant to include any petroleum distillate A fuel filter/water separator 36 and microbial decontamination device 38 are mounted on a vertical upright support 27 of the skid platform 22 at a 90° angle to the skid base. The filter/water separator mechanism 36 is preferably a Separ 2000 series manufactured by Losing Filter-Production Company which is an off the shelf filter. Fuel is sucked from a conduit 60 into the filter through an inlet port 37 where it then enters the centrifuge of the filter separating larger particles of dirt and droplets of water down to a range of 2 to 60 microns. The centrifuge in the filter does not spin. The filter spins the fuel in a circular motion as it passes through the channels of the centrifuge. As the fuel comes out of the centrifuge it hits the side of the bowl allowing the dirt and water to settle to the bottom of the filter bowl. Filter elements for use in the filter mechanism are available in 2, 10, 30 or 60 micron rating and can be cleaned by back flushing procedures. The microbial decontamination device 38 is manufactured by De-Bug Worldwide Ltd. and the De-Bug unit model numbers: L1000, (250 gallons per hour), L4000 (G/H 1000), L5000 (G/H 1350). As the fuel enters the De-Bug microbial decontamination unit, it is directed through a multiple magnet pack along a specific axial and cross radial flow path. Microbes that may be present in the fuel are destroyed as they are subjected to a minimum of 24 magnetic field changes from the inlet to the discharge port of the unit. The resultant cellular debris, now sub-micron in size remains suspended in the fuel where it can pass harmlessly through filter media, injectors and other fuel system components. The operation of this unit is fully explained in U.S. Pat. Nos. 5,055,188 and 5,248,437 issued Oct. 8, 1991 and Sep. 28, 1993 respectively, which are incorporated herein and made a part hereof by reference.

Figure 1:
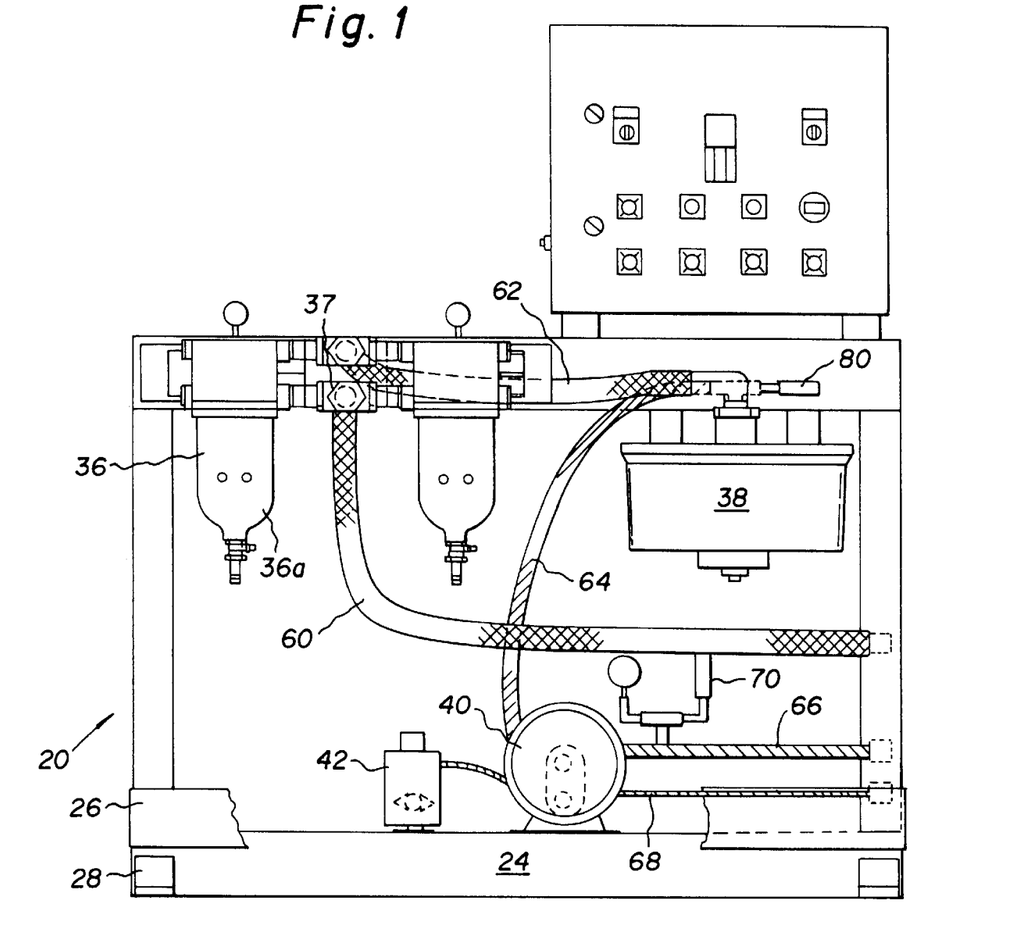
FIG. 1 is a front elevation view of the fuel cleaning and recirculating assembly of the invention.
Figure 3:
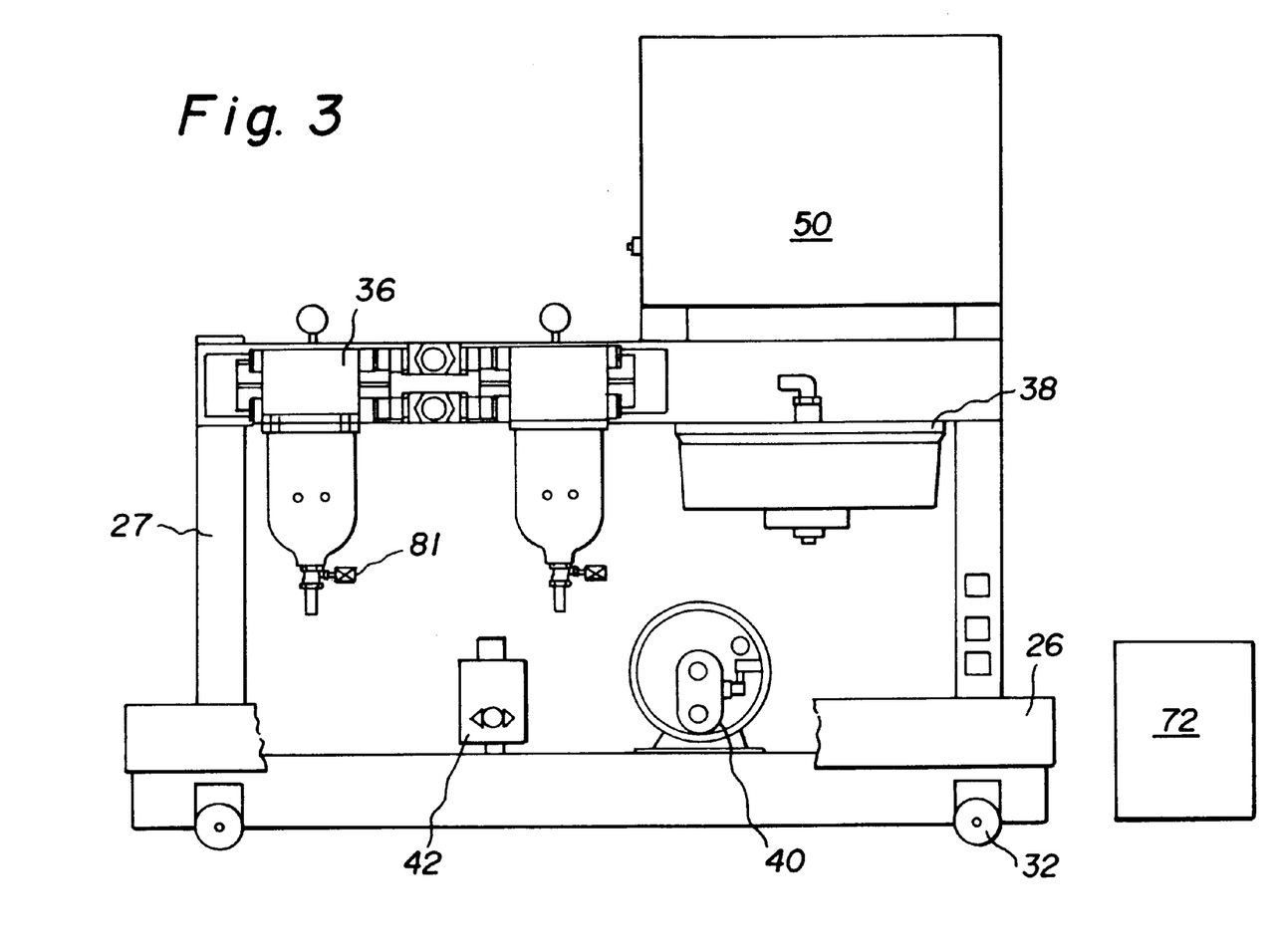
FIG. 3 is a front elevation view of the fuel cleaning and recirculating assembly of the invention with conduits and controls removed.
Figure 4:
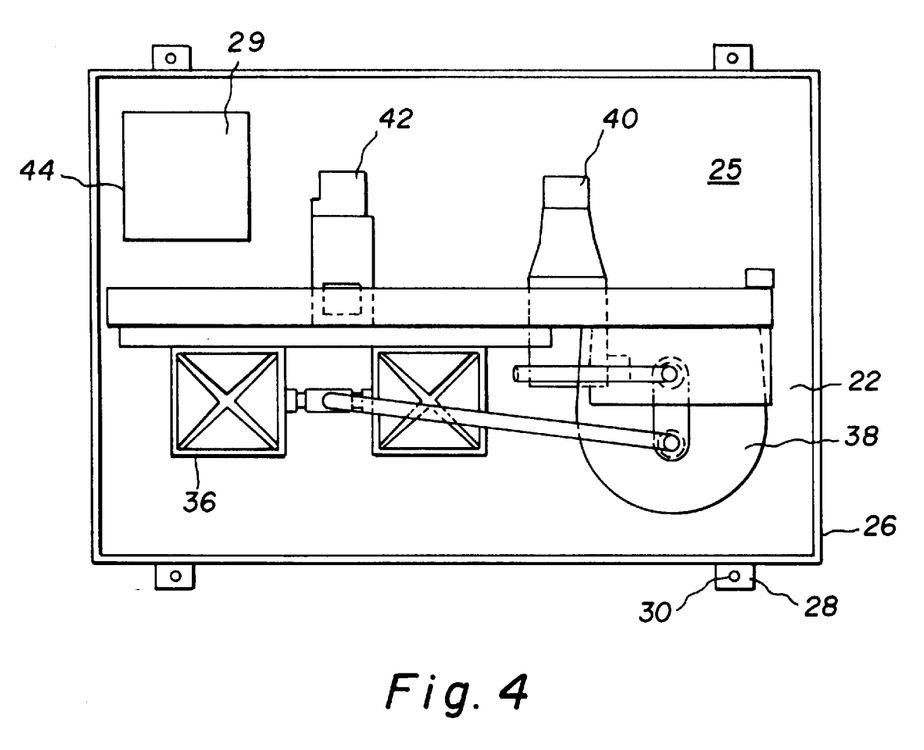
FIG. 4 is a plan view of the invention shown in FIG. 3.
Figure 5:
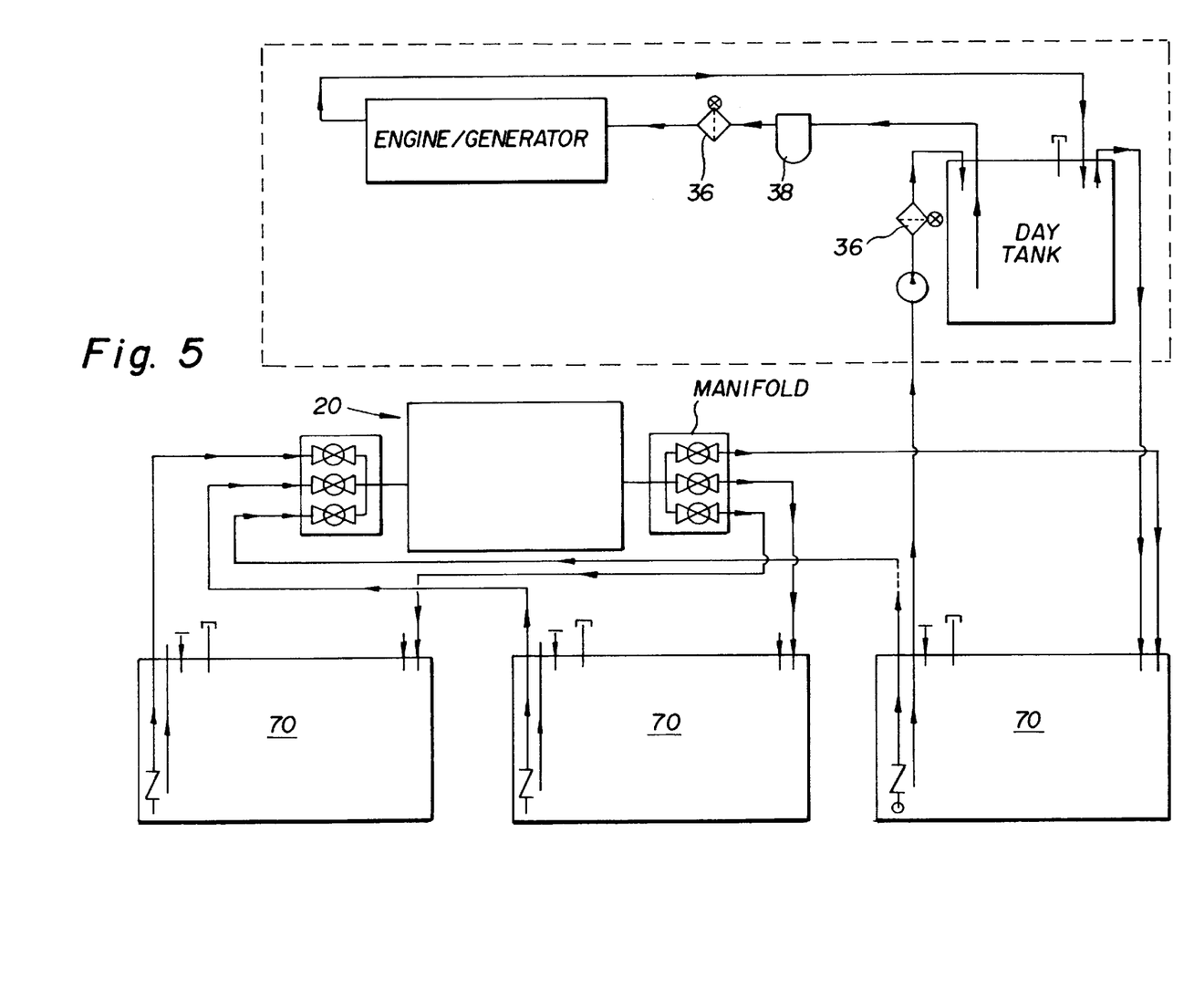
FIG. 5 is a schematic flow chart showing the relationship between the present invention and fuel tanks which are having fuel recirculated and cleaned.

A standard off the shelf circulation pump assembly 40 off the shelf manufactured by Oberdorpher Company and a standard off the shelf water evacuation pump 42 manufactured by ITT Jabsco are mounted on the horizontal base portion 25 of the skid 22. A control box 50 is mounted on the vertical support 27 above all of the noted components to allow easy access by the operator and eliminate any risk of fuel spills on the circuitry. All exposed wires are wrapped with flexible wire wrap and neatly secured to skid. A splash pan sump 44 is provided on the base planar surface 25 of the skid, capable of collecting any leaks from the fuel filter/water separator, microbial decontamination device, pumps, fittings and user connection points. Connecting hoses 60, 62 and 64 respectively connect the filter mechanism 36 to a fuel storage tank 70, the filter mechanism 36 to the microbial decontamination device 38 and the microbial decontamination device 38 to the circulation pump 40. The skid 22 is fitted with a sump 29 and float switch for leak detection and brought to an alarm point. System/alarm indicator lights and horn, and operator controls are mounted on front cover of the control box 50 so they are externally visible and accessible.

All pipe connections are made up with pipe joint compound with Teflon or equivalent, suitable for diesel fuel, diesel fuel additives, methyl esters, and other distillates. All fuel lines are Schedule 40 Black Pipe, high pressure hydraulic tubing with compression fittings, and suction hose as applicable, compatible with diesel fuel, diesel fuel additives, methyl esters, and other distillates. All piping is brought to a common connection coupling bracket, located on the right side rear (facing the system), and mounted within the perimeter of the steel base to contain spills or drips by either manufacturing defect or improper customer connection. The system is fitted with three circuit breakers, one each, for the circulating pump 40, the water evacuation pump 42, and the controls. The breakers are NEMA rated. Power bus to be sized for 115V, 20, 30 AMP single-phase service.

During operation, the diesel fuel or distillate is lifted from the storage tank 70 by suction generated by the system's main re-circulation pump 40. Located first on the suction side of this pump 40 is a filter mechanism 36 that provides water separation. This mechanism 36 is capable of water separation efficiency of over 99.5% of free and emulsified water. Following the water separation in the filtration mechanism, the filter mechanism passes the fuel through filter elements for particulate filtration. The filter elements are capable of removal of particles ranging from 30 down to two microns is size. Next, is microbial decontamination device 38 which can include any device capable of killing over 95% of all microbes which sustain in distillate fuel including bacteria, yeast, spores, algae, and fungi. The re-circulation pump discharge is then directed back to a fuel storage tank 70 or transferred to another tank as per FIG. 5 as directed by the operation.

In the normal operation mode, the system is operated by an automatic electronic pre-set programmable timer, to accommodate total tank capacity plus a factor of 50%. Optional tank level sensing and the PLC option will calculate the system run time as a function of the actual fuel level in the tank. In a separate embodiment, the system is provided with an override, allowing the operator to temporarily interrupt the automatic cycle for temporary operation, to re-circulate the tank quantity at the time of a new fuel delivery. This will ensure system objectives to maintain high fuel quality, ready and available for use. After the temporary cycle has completed, the system returns to automatic operation.

During operation, the diesel fuel supply for the system 20 is lifted from the fuel storage tank 70 by the system's main circulation pump 40. On the suction side of this pump, is a fuel filter/water separator 36 and a microbial decontamination multiple-magnet device 38 to control all microbial growth in the fuel. The pump discharge conduit 66 is directed back to the fuel storage tank 70 and has mounted thereon a discharge pressure gauge 74 to monitor clogging of the fuel return line or an improperly closed service valve by the operator.

Figure 2:
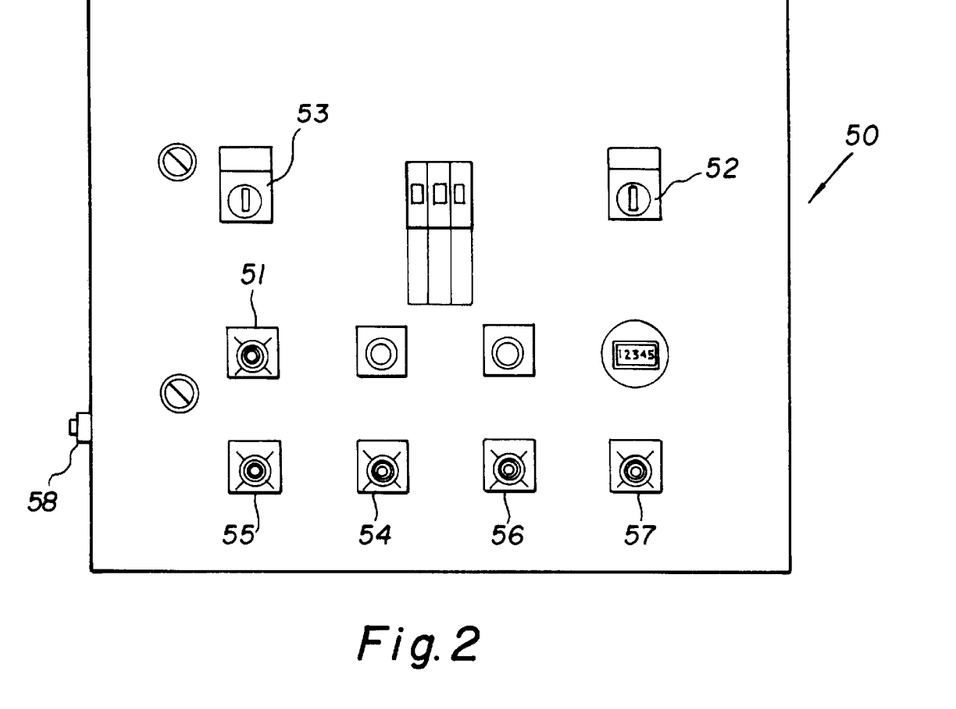
FIG. 2 is an enlarged front elevation view of the control cover shown in FIG. 1.

The microbial decontamination device 38 employs a multiple magnet pack, capable of destroying 97.6% of all microbes normally found in diesel fuel in one pass, without chemical biocide treatment. The co-mingled water separated from the fuel by the filter during the system operation is collected within the filter bowl(s) displaying an alarm condition for operator removal. There is a also a provision for automatic water discharge from pump 42 through conduit 68 to a polypropylene collection drum 72. Water sensing circuitry, solenoid actuated valves, and a dedicated diaphragm pump perform this function. The control panel 50 is provided with indicator lights on its face for various operational and failure conditions. The control box 50 will provide normal operation indicator light, as well as several alarm points including fuel leak, high discharge pressure, clogged filter, full water drum, all brought into a summary or individual dry "c" normally open contact(s), suitable for optional remote monitoring. The circuit breakers, electronic timer, and run meter will also be located in the control box. On the control box light 51 shows the system normal, light 52 shows the main circulation pump on, light 53 shows the filter water pump on, light 54 shows if there is an oil leak, light 55 shows high discharge pressure, light 56 shows a clogged filter and light 57 shows a full water bowl drum. An audible alarm 58 with a minimum 80 db horn with a local silence button is activated by (1) fuel leak; (2) high discharge pressure; (3) clogged filter; and (4) full water bowl/drum.

Figure 6:
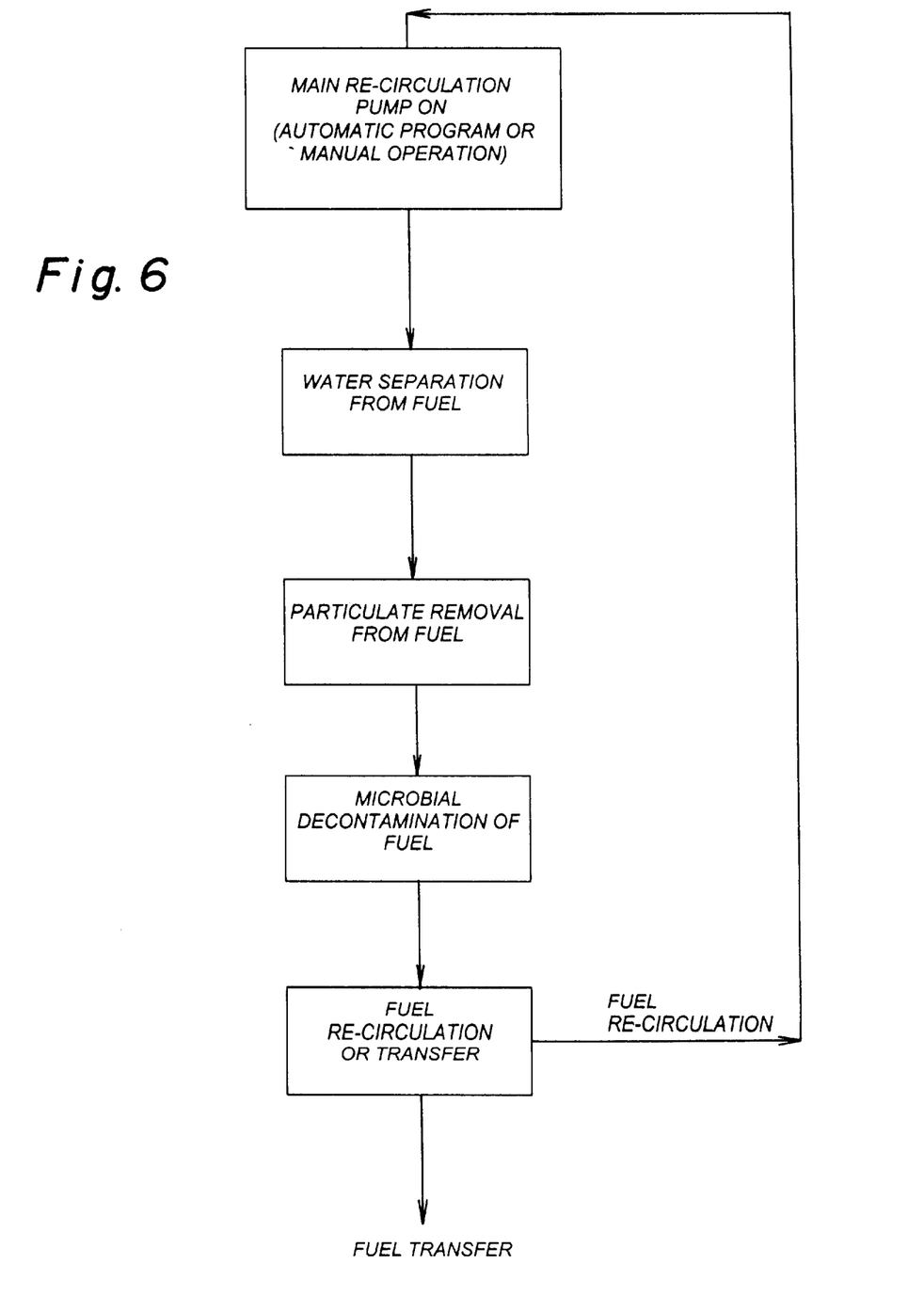
FIG. 6 is a schematic flow chart of the operation of the fuel cleaning and recirculating assembly of the invention.

The system is designed with controls that range from a basic manually operated twist timer to a sophisticated microprocessor controller with key critical alarms and optional remote monitoring capability. The following describes the complete range of control logic circuitry: with or without a PLC for the following functions to be provided:

1. Power On—As shown in FIG. 6 power available to the motors and timer, no failure conditions exist.

Figure 7:
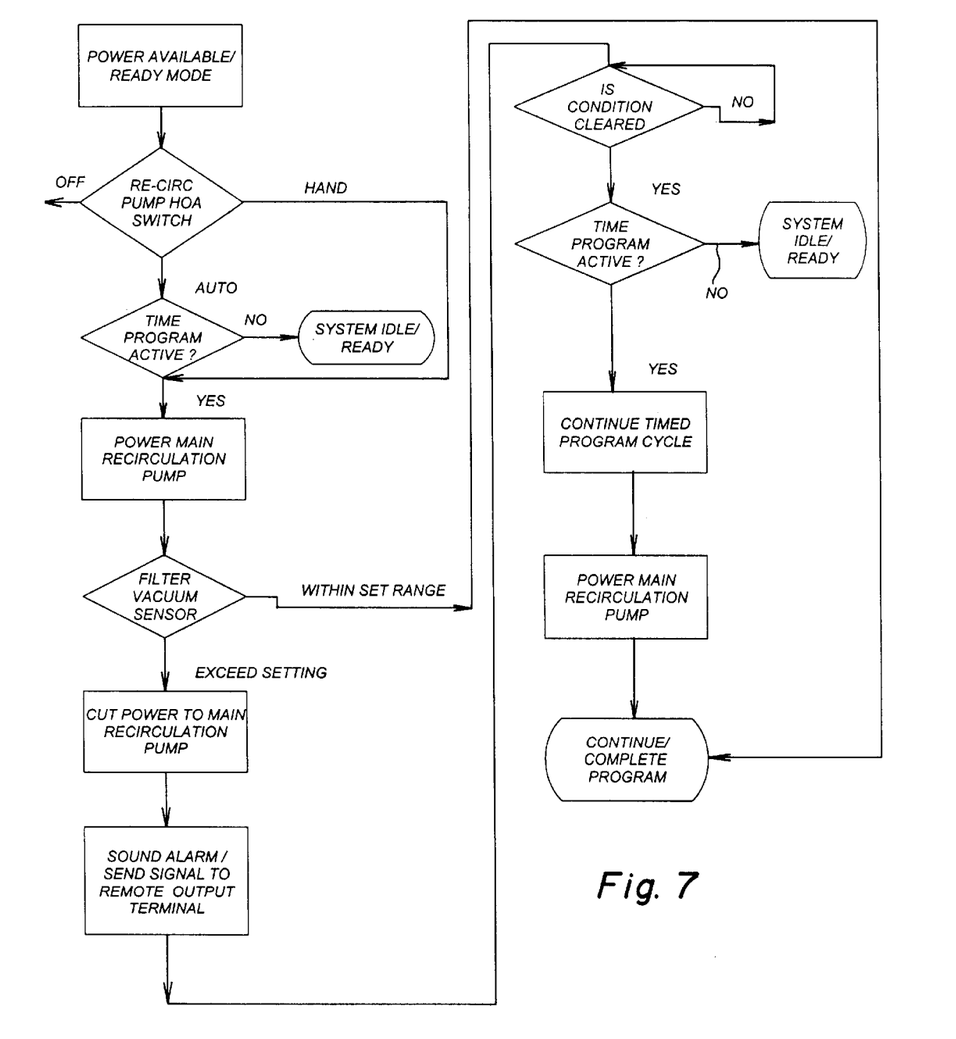
FIG. 7 is a schematic flow chart of the operation of the clogged filter sensing aspect of the invention.

2. Clogged Filter—As shown in FIG. 7 a factory calibrated vacuum sensor 80 mounted in the suction side detects pressure drop. Alarm/Fail condition exists if the setting is exceeded. As the system is operational in either the hand or automatic mode, factory calibrated vacuum sensor mounted in the suction side detects a vacuum value determined to be excessive. The sensor's normally open contacts close, causing relay circuitry or microprocessor controller to cut power to the motor of the main re-circulation pump. The alarm 58 is sounded, and a signal is sent to the remote output terminal. The alarm may be silenced by depressing the monetary switch, however, failure is not cleared until the condition is remedied. When the condition is remedied, the system will continue with the timed program cycle if the time lapse has not exceeded the programmed shut off time. Otherwise, the system returns to idle/ready status.

Figure 8:
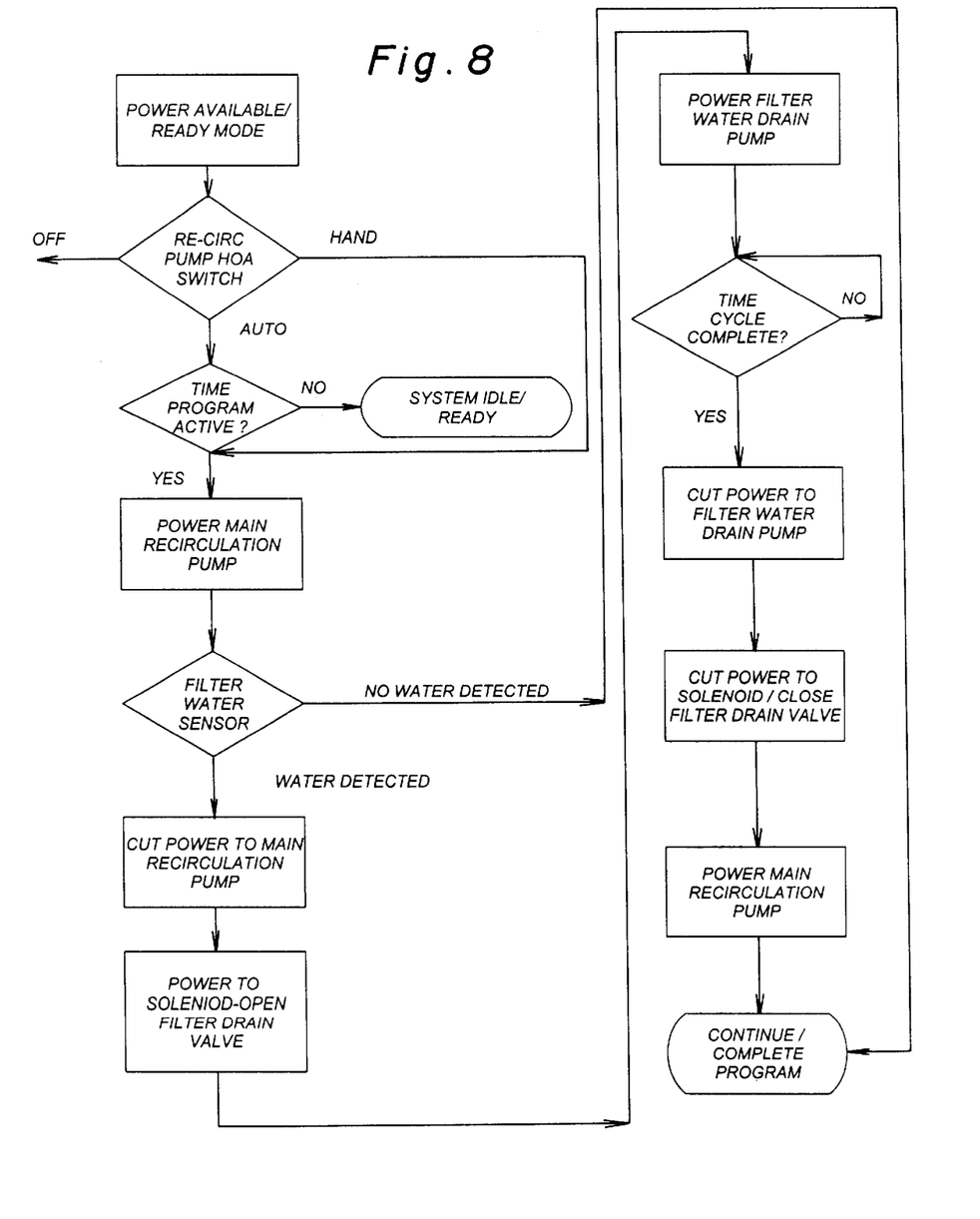
FIG. 8 is a schematic flow chart of the operation of the filter water detection drain aspect of the invention.

3. Filter Water Detection/Drain—As shown in FIG. 8 a water collection bowl 36a fills with water separated from the fuel. When filled to preset level, filter water drain pump 42 is activated, draining water to the water collection drum 72. Alarm/fail condition exists when the filter bowl is filled to a designed set level if automatic water drain feature is not installed. As the system is operational in either the hand or automatic mode, the water collection bowl 36a fills with water separated from the fuel. At a preset level, the sensor's normally open contacts close, causing relay circuitry or microprocessor controller to cut power to the motor of the main circulation pump. If automatic water drain feature is not installed, the alarm is sounded, and a signal is sent to the remote output terminal. If an automatic water drain feature is installed, the following occurs.:

a. Power is provided to the solenoid controlled valve 81 located at the drain of the filter bowl, and the valve is opened.

b. Power is provided to the filter water drain pump, and the pump begins a preset timed pump cycle designed to drain the volume of the bowl for the filter used in the system, to the water collection drum 72 c. When the timed cycle is complete, power is cut to the filter water drain pump.

d. Power is cut to the solenoid controlled valve 81, causing the valve to close.

When the condition is remedied, the system will continue with the timed program cycle if the time lapse has not exceeded the programmed shut off time. Otherwise, the system returns to idle/ready status.

Figure 9:
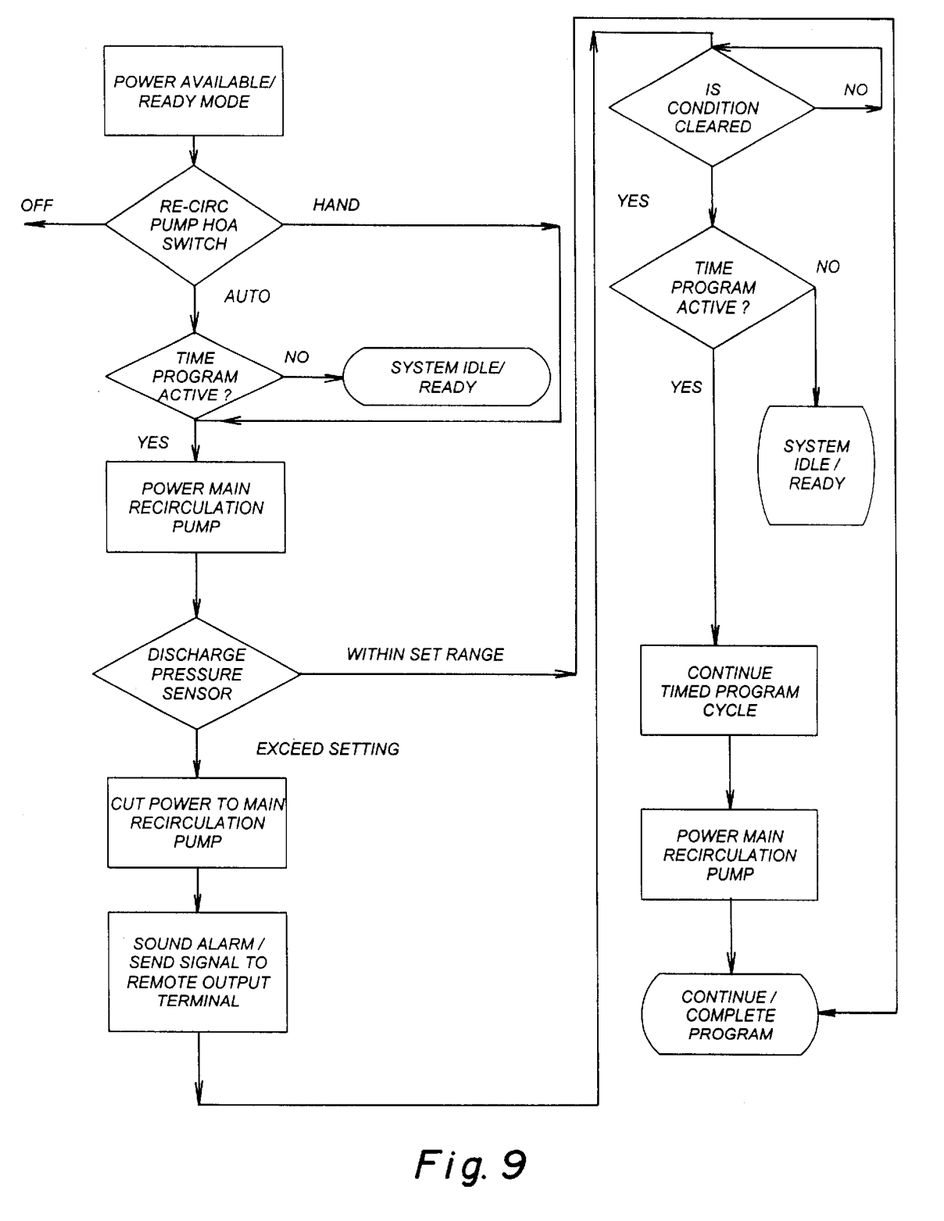
FIG. 9 is a schematic flow chart of the operation of the high discharge pressure aspect of the invention.

4. High Discharge Pressure—As shown in FIG. 9 a factory calibrated pressure sensor 74 detects high discharge pressure at pump discharge caused by possible blockage. Alarm/fail condition exists if the setting is exceeded. As the system is operational in either the hand or automatic mode the factory calibrated pressure sensor 74 detects high discharge pressure at pump discharge caused by possible blockage. The sensor's normally open contacts close, causing relay circuitry or microprocessor controller to cut power to the motor the main re-circulation pump. The alarm is sounded, and a signal is sent to the remote output terminal. The alarm may be silenced by depressing the monetary switch, however, the failure is not cleared until the condition is remedied. When the condition is remedied, the system will continue with the timed program cycle if the time lapse has not exceeded the programmed shut off time. Otherwise, the system returns to idle/ready status.

Figure 10:
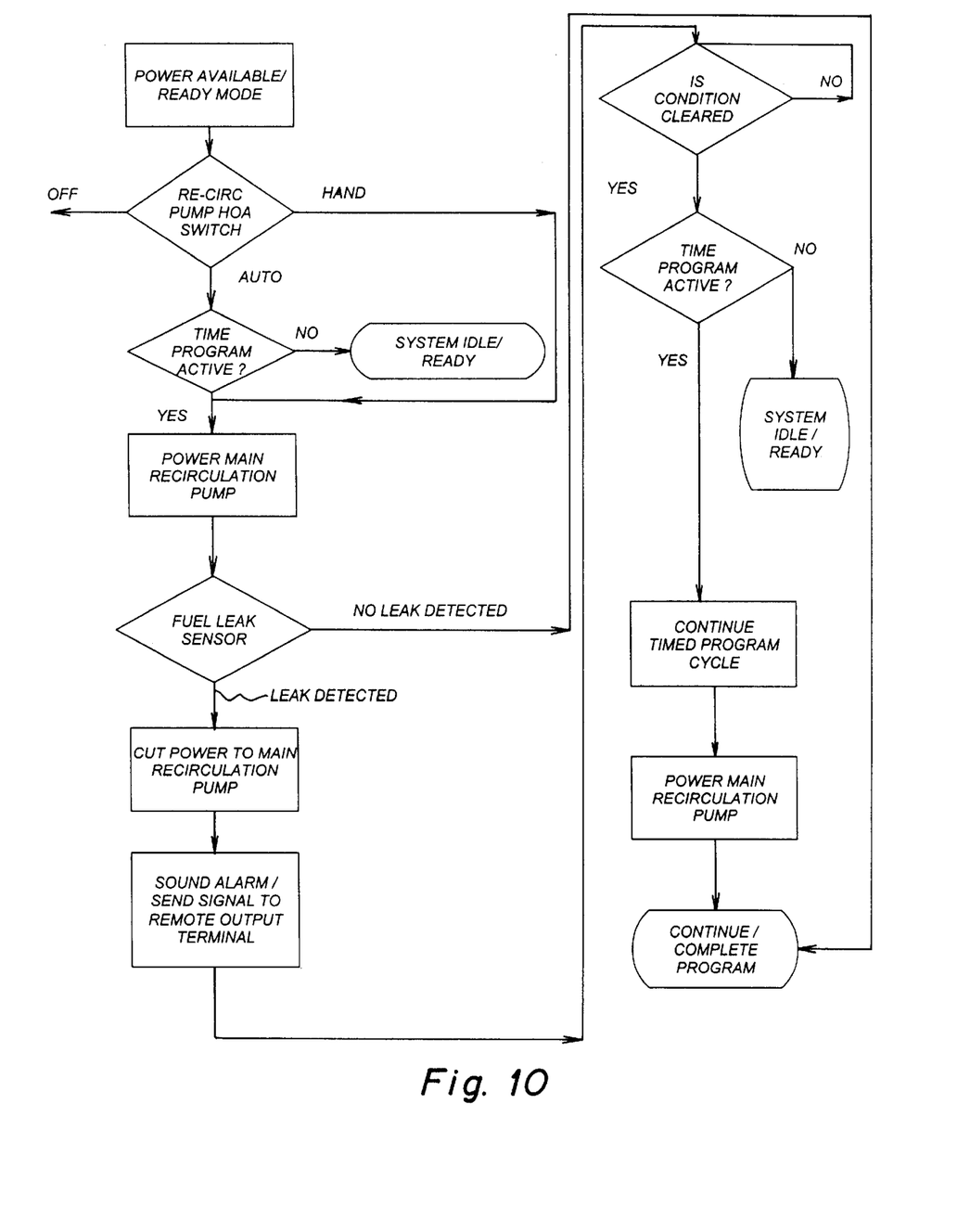
FIG. 10 is a schematic flow chart of the operation of the fuel leak aspect of the invention.

5. Fuel Leak—As shown in FIG. 10 a float sensor 29 located in splash pan sump 44 detects when a leak exists. Alarm/fail condition exists if a fuel leak is detected. As the system is operational in either the hand or automatic mode, a factory calibrated float sensor located in the splash pan sump detects when a leak exists. The sensor's normally open contacts close, causing relay circuitry or microprocessor controller to cut power to the motor the main re-circulation pump. The alarm is sounded, and a signal is sent to the remote output terminal. The alarm may be silenced by depressing the monetary switch, however, the failure is not cleared until the condition is remedied. When the condition is remedied, the system will continue with the timed program cycle if the time lapse has not exceeded the programmed shut off time. Otherwise, the system returns to idle/status.

Figure 11:
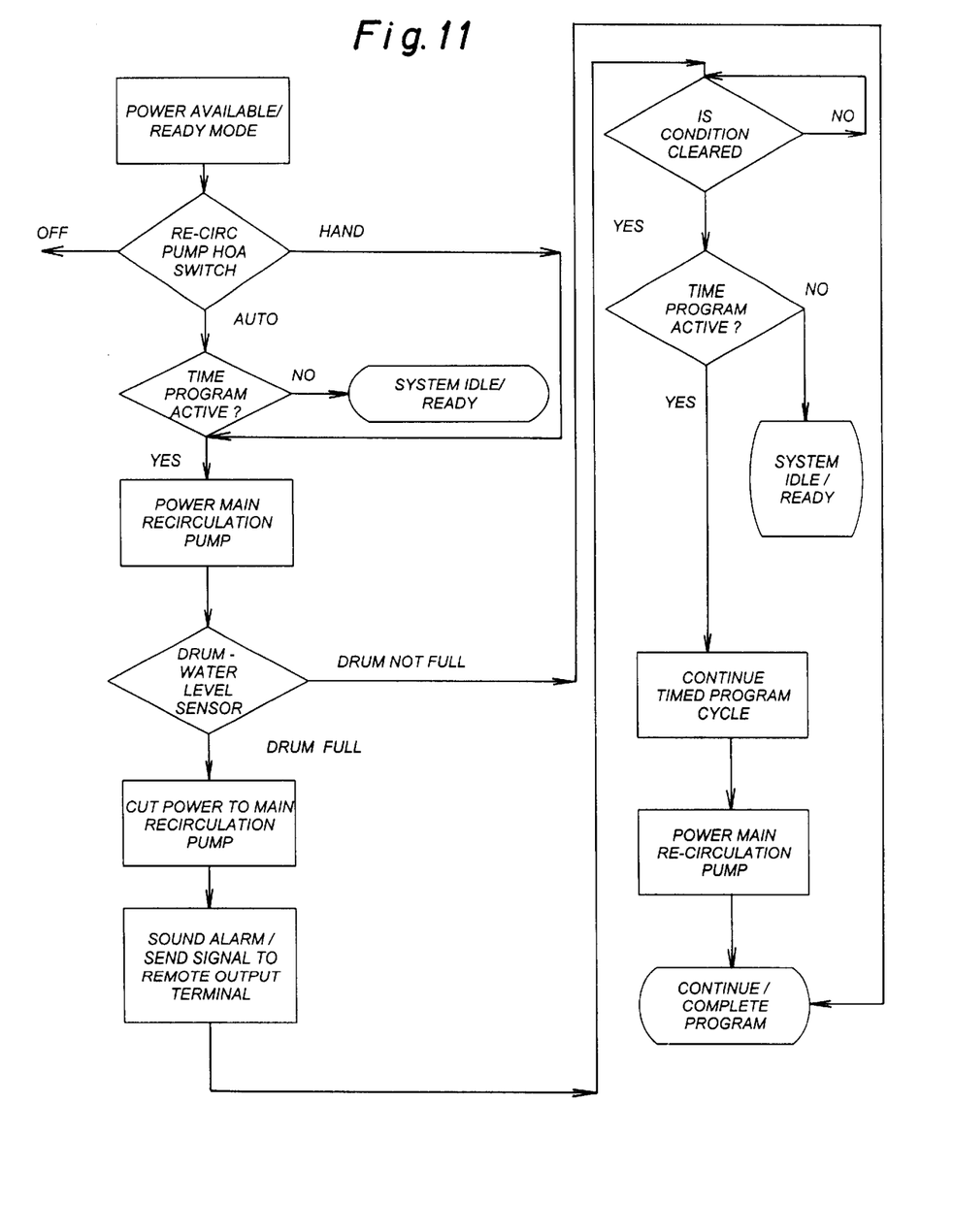
FIG. 11 is a schematic flow chart of the operation of the full water storage drum aspect of the invention.

6. Full Water Collection Drum—As shown in FIG. 11 a separate water collection drum 72 fills as water separated from the fuel is pumped from the filter water collection bowls. Alarm/fail condition exists when the filter bowl 36a is filled to a designed set level. As the system is operational in either the hand or automatic mode, a factory calibrated float sensor (not shown) located in the water collection drum detects when the drum becomes filled to a designed level. The sensor's normally open contacts close, causing relay circuitry or microprocessor controller to cut power to the motor the main re-circulation pump and filter water drain pump. The alarm is sounded, and a signal is sent to the remote output terminal. The alarm may be silenced by depressing the monetary switch, however, the failure is not cleared until the condition is remedied. When the condition is remedied, the system will continue with the timed program cycle if the time lapse has not exceeded the programmed shut off time. Otherwise, the system returns to idle/status.

Figure 12:
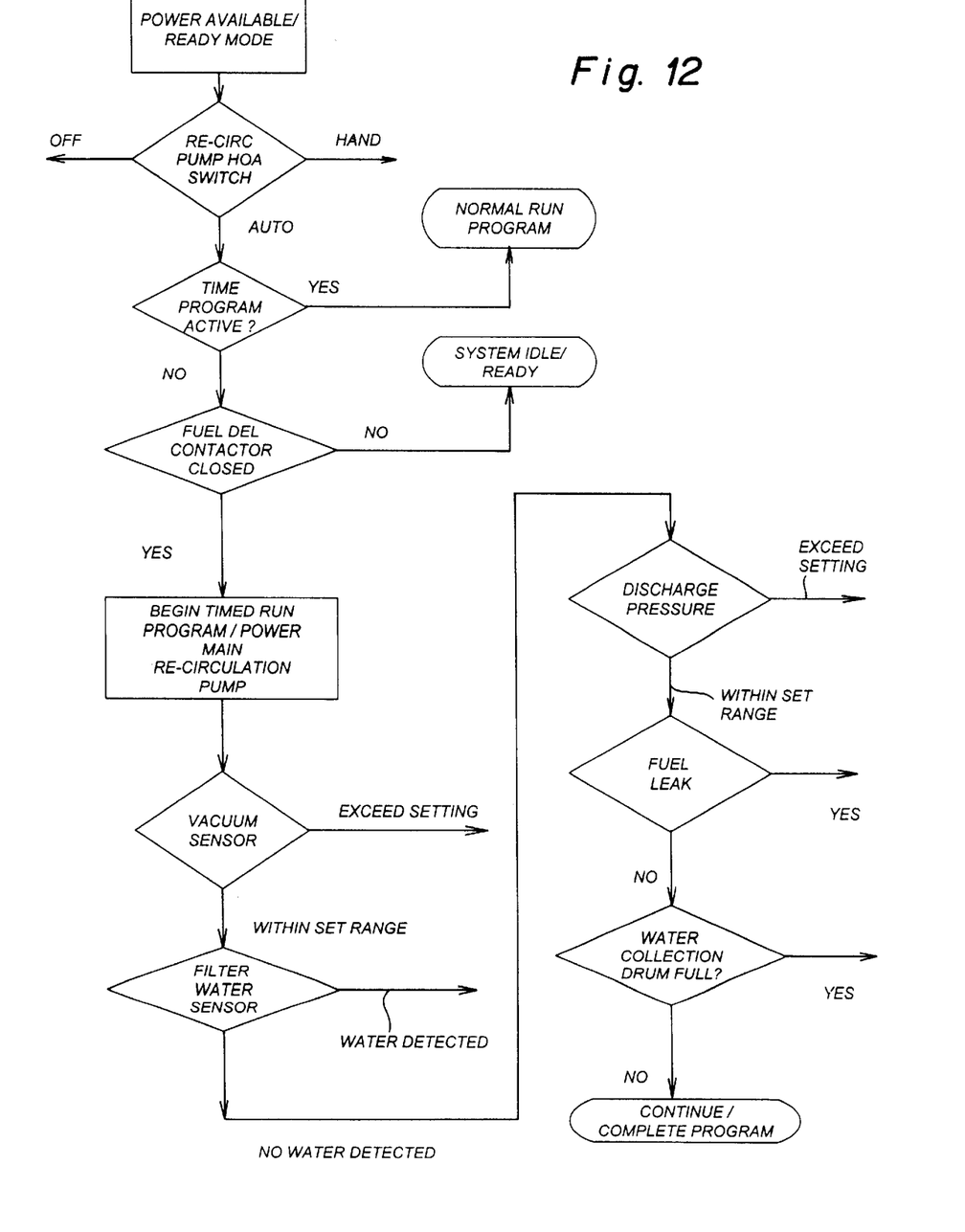
FIG. 12 is a schematic flow chart of the operation of the fuel delivery aspect of the invention.
Figure 13:
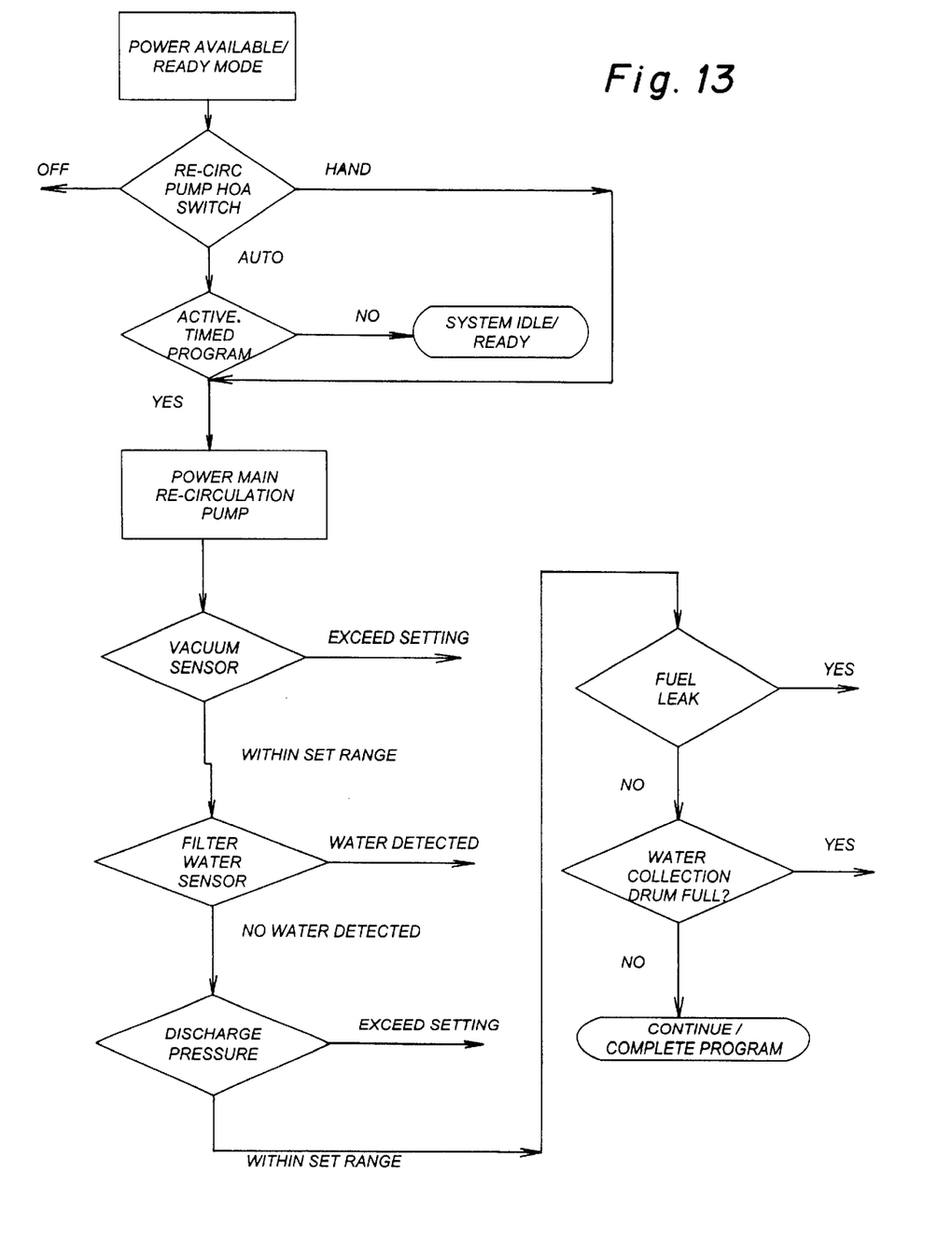
FIG. 13 is a schematic flow chart of the operation of the control logic of the invention.

7. Fuel Delivery Button—As shown in FIG. 12 this allows operator to temporally interrupt an automatic timed program cycle for temporary operation to re-circulate the tank quantity at the time of a new fuel delivery. As the system is in the idle/ready mode, this feature allows the operator to initiate a single complete program cycle to recirculate and treat the tank quantity at the time of a new fuel delivery. Operation of this feature requires the HOA switch for the main re-circulation pump be in the "automatic" position, and is prevented if the system is in a fail/alarm condition at the time of initiation. When the momentary contact is closed, the system's programmable logic controller (PLC) directs start-up of the main re-circulation pump, and begins a timed cycle based on pre-programmed data or signal input from a separate tank level sensing device. The system functions with all normal features during this operation. When the cycle is complete, the PLC idles the system, and the system control is returned to the normal program.

8. Tank Proportional Control—combined with a signal output from a separate tank level sensing device, calculates the system timed program cycle as a function of the actual fuel level in the tank vs. pres time value based on total tank capacity. This feature is designed to perform a calculation to determine the system run time during each program cycle vs. a preset program based on total tank capacity. i.e. The system run time varies with each cycle based on the actual volume of fuel in the tank for which a separate tank level sensing device is located.

Upon the programmed day/time, the PLC performs a calculation to determine the system run time using the signal output from a separate tank level sensing device. Operation of this feature requires that the PLC directs start-up of the main re-circulation pump, and begins the calculated timed cycle. The system functions with all normal features and alarms during this operation. When the cycle is complete, the PLC returns the system to idle/ready status.

9. Horn Silence/Reset—silences alarm horn, and resets only cleared alarm points.

The system is designed to detect water vs. diesel fuel, to ensure minimal quantities of diesel fuel being pumped into water collection barrel. An additional device separates the trace level diesel fuel from the water in a polypropylene collection drum to re-mediate the water to meet or exceed the EPA accepted guidelines for discharge into storm drains.

In the foregoing description, the invention has been described with reference to a particular preferred embodiment, although it be understood that specific details shown are merely illustrative, and the invention may be carried out in other ways without departing from the true spirit and scope of the following claims.

What is claimed is:

1. A fuel recirculation and cleaning assembly comprising a support base, a plurality of legs mounted to said support base, wheel means mounted to said legs allowing said support base to be transported, an upright support secured to said support base, a water separator and fuel filter assembly mounted to said upright support, a microbial decontamination device for destroying the cellular integrity of microorganisms carried by fuel secured to said upright support and fluidly connected to said water separator and fuel filter assembly by conduit means, a circulation pump mounted to said support base, said circulation pump being operated at a minimum flow rate of at least 250 GPH and being connected to an outlet of said microbial decontamination device by conduit means and a conduit leading from said circulation pump to a fuel storage tank and microprocessor controls including timer control means to start and stop said circulation pump.

2. A fuel recirculation and cleaning assembly as claimed in claim 1 including a water pump connected to said water separator and fuel filter assembly by conduit means, said water pump also being connected by fluid conduit means to a water storage tank, said water storage tank being provided with a water level sensing means to determine the level of water deposited in said tank, and alarm means electrically connected to said sensing means to notify an operator when a predetermined level of water has been deposited in said tank.

3. A fuel recirculation and cleaning assembly as claimed in claim 1 wherein said discharge pump has a discharge pressure gauge mounted downstream from its discharge.

4. A fuel recirculation and cleaning assembly as claimed in claim 1 wherein said timer control means includes a control box with alarm means to indicate the functioning of assembly components, including operation of a main circulation pump, operation of a water filter pump, and indicating fuel leaks, high discharge pressure, a clogged filter and a full water drum.

5. A fuel recirculation and cleaning assembly for unmanned automatic cycling of fuel comprising a support base with a top planar surface, an upright support secured to said support base, a control box mounted to said upright support, said control box containing a microprocessor and circuit means which energizes and de-energizes a circulation pump at periodic times and senses pressure differentials in the conduits, a filter assembly for separating water from fuel and trapping particulate matter mounted to said upright support, means to fluidly connect said filter assembly to a fuel storage tank, means to discharge water separated from said fuel connected to said filter assembly, a magnetic microbial decontamination device secured to said upright support and fluidly connected to said filter assembly by conduit means, a circulation pump mounted to said support base, said circulation pump having a flow rate in excess of 250 GPH being connected to an outlet of said microbial decontamination device by conduit means to transport fuel from said fuel storage tank, a conduit leading from said circulation pump to a fuel storage tank carrying cleaned fuel back to said fuel storage tank and timer control means to start and stop said circulation pump in a predetermined cycle.

6. A fuel recirculation and cleaning assembly as claimed in claim 5 wherein means to discharge water separated from said fuel comprises valve means connected to said filter assembly, a conduit connected to said valve means and a drainage pump and a water storage tank fluidly connected by a conduit downstream of said drainage pump.

7. A fuel recirculation and cleaning assembly as claimed in claim 5 wherein said support base defines an upwardly extending flange which forms an enclosed area around said top planar surface, a splash pan sump mounted to said planar surface of said support base and a floating operating valve for said splash pan sump to determine the fluid level in said splash pan.

8. A fuel recirculation and cleaning assembly as claimed in claim 5 wherein said filter assembly comprises two connected filters with water collecting bowls, and sensor means are mounted on the water collecting bowls of said filter assembly to sense when water is collected to a predetermined level.

9. A fuel recirculation and cleaning assembly as claimed in claim 5 wherein a high pressure discharge sensor is mounted on the downstream side of said circulation pump to detect high discharge pressure caused by fluid blockage.

10. A fuel recirculation and cleaning assembly as claimed in claim 5 including a drainage pump mounted to said support base and fluidly connected to said filter assembly, a water storage tank connected by conduit means to said drainage pump.

11. A fuel recirculation and cleaning assembly as claimed in claim 10 wherein said water storage tank has a float sensor mounted therein to determine when water level has reached a predetermined level, said float sensor signaling means to cut the power to said circulation pump and said drainage pump.

12. A method of automatically cleaning and recirculating stored petroleum based fuel comprising the steps of:
   a. removing fuel from a storage container in an amount exceeding the static capacity of the storage container by a pump at a minimum flow rate of at least 250 GPH and transporting the fuel by conduit means to a first filtration device which removes water and particulate matter from the fuel;
   b. transporting water separated from said fuel into a separate storage tank;
   c. transporting the filtered fuel from the filtration device through a second conduit means into a magnetic microbial decontamination device to destroy living microorganisms in the fuel; and
   d. transporting the treated cleaned fuel from the magnetic microbial decontamination device into said storage container.

13. A method of cleaning and recirculating stored petroleum fuel as claimed in claim 12 wherein said fuel is transported by a circulation pump.

14. A method of cleaning and recirculating stored petroleum fuel as claimed in claim 12 including the step or repeatedly cycling said fuel until the contents of the storage tank have been recycled at least 150%.

* * * * *